(12) United States Patent
Sumner

(10) Patent No.: US 10,164,226 B2
(45) Date of Patent: Dec. 25, 2018

(54) SYSTEM AND METHOD FOR MITIGATING THE EFFECTS OF BATTERY LEAKAGE

(71) Applicant: Greg Sumner, Covington, KY (US)

(72) Inventor: Greg Sumner, Covington, KY (US)

(*) Notice: Subject to any disclaimer, the term of this patent is extended or adjusted under 35 U.S.C. 154(b) by 41 days.

(21) Appl. No.: 15/496,605

(22) Filed: Apr. 25, 2017

(65) Prior Publication Data

US 2018/0309102 A1    Oct. 25, 2018

(51) Int. Cl.
*H01M 10/052* (2010.01)
*H01M 2/10* (2006.01)

(52) U.S. Cl.
CPC ...... *H01M 2/1094* (2013.01); *H01M 2220/30* (2013.01); *H01M 2300/0014* (2013.01)

(58) Field of Classification Search
CPC .................. H01M 10/052; H01M 10/0525
See application file for complete search history.

(56) References Cited

U.S. PATENT DOCUMENTS

| | | | | |
|---|---|---|---|---|
| 5,397,661 A | * | 3/1995 | Kaun | H01M 2/065 |
| | | | | 429/181 |
| 5,642,561 A | * | 7/1997 | Tuttle | H01M 2/0222 |
| | | | | 29/623.2 |
| 2012/0149981 A1 | * | 6/2012 | Khait | A61B 1/00158 |
| | | | | 600/109 |

FOREIGN PATENT DOCUMENTS

| | | |
|---|---|---|
| JP | S59224056 A | 12/1984 |
| JP | 2000260438 A | 9/2000 |
| JP | 2005123096 A | 5/2005 |
| JP | 2007005075 A | 1/2007 |

OTHER PUBLICATIONS

European Patent Office; Search Report and Written Opinion in related International Patent Application No. PCT/US2018/029377 dated Aug. 7, 2018; 14 pages.

* cited by examiner

*Primary Examiner* — Olatunji A Godo
(74) *Attorney, Agent, or Firm* — Wood Herron & Evans LLP

(57) ABSTRACT

A system for coupling with a terminal end of a battery is used for the mitigation of battery leakage and includes a conductive disc and an absorption ring in combination that fits to an end of the battery. The conductive disc has a center section that is electrically coupled with the battery and a peripheral section that surrounds the center section. The absorption ring is secured to a surface of the conductive disc and extends around the peripheral section to surround the disc center section. The absorption ring includes an absorbent material that absorbs any liquid escaping from the battery. An adhesive material is positioned proximate to the absorption ring and secures the system to an end of the battery.

20 Claims, 8 Drawing Sheets

SYSTEM AND METHOD FOR MITIGATING THE EFFECTS OF BATTERY LEAKAGE

FIELD OF INVENTION

This invention relates generally to systems and methods for addressing chemical leakage in batteries, and more specifically to a system that captures battery discharge and controls its escape for preventing damage to battery-powered devices.

BACKGROUND OF THE INVENTION

Portable disposable and rechargeable batteries, and particularly alkaline batteries, are used as a power source for powering a large number of electronic devices. Such batteries rely upon a chemical reaction for the generation of power and use an alkaline electrolyte, such as potassium hydroxide, rather than an acid composition. As the batteries discharge, such as through usage in powering a device or in a gradual discharge scenario, the chemistry of the battery element changes. More specifically, hydrogen gas is generated as a by-product by the active battery. The hydrogen gas that is generated increases the pressure inside the housing of the battery. In leakage scenarios, the pressure becomes so great that it creates a significant strain on the battery housing or other elements of the battery. As such, the pressure may rupture an insulating rubber seal at a terminal end of the battery or the outer metal canister of the battery, or both.

The leakage also includes the liquid alkali potassium hydroxide material in the battery, which is a particularly corrosive liquid that attacks and destroys metal elements that it contacts. The leakage forms a white fluffy powder of potassium carbonate that typically will appear at the end of the battery representing the negative (−) terminal. Usually such leaking material in liquid form can travel all over the battery chambers and elsewhere within the interior of an electronic device. The corrosive effect of the potassium hydroxide can be particularly destructive to the conductive element of the device, such as the copper traces that are positioned on the printed circuit boards of the device as well as exposed electronics. Often the discharge is significant and corrosive enough to destroy the functionality of the electronics of the device, rendering the device unusable. Also, the corrosive effect of the discharge may attack and damage the plastic housing of the electronic device that forms the battery compartment. Accordingly, the damage of leaking batteries can be significant.

Battery leakage damage is often inevitable as many electronic devices, such as radios, flashlights, etc are often only used periodically and then stored away for long periods of time with the batteries still inside. Leakage will eventually occur. Alkaline batteries will also gradually self-discharge over time. Such self discharge occurs both while the batteries are sitting on a shelf or are installed in a device. Over time the dead or discharged batteries will leak. The process of gradual drainage of power from batteries that are not in use is slower than for those batteries that are in use inside of a device. More specifically, in use, batteries will often discharge due to small trickle current drainage or parasitic current drainage that still occurs even if a device is powered off. Furthermore, many existing electronic devices have active circuitry that must be powered, and thus those devices will draw current from the battery even when the device is powered off. Therefore, portable devices that use alkaline batteries have features that slowly discharge batteries, even when the devices are left unattended and unused, and if left unattended for long periods of time, the drained or dead batteries will eventually leak. Furthermore, such leakage can also be accelerated if the battery environment experiences high temperatures, such as sitting in a hot car during the summertime.

Accordingly, electronic devices using alkaline batteries are always at risk for battery leakage and eventual damage. Depending on the device, the can result in significant monetary loss if the device is rendered unusable and has to be replaced. While removing the batteries is an option each time a device is turned off and stored away, such a step is often impractical since you will need a power source once you want to use the device again. Always having new batteries at the ready to insert into each device also is not a particularly viable option. Even if they are removed and stored adjacent the device, they can still leak and be rendered unusable, even if damage to the device is avoided.

Therefore, it is desirable to prevent the damage done and inconvenience and expense of leaking batteries. There have been considerable efforts made to try and improve batteries and prevent leakage damage by improving the overall construction and sealing features of the battery. However, such solutions have proven generally unsuccessful. Batteries still leak and cause damage. Accordingly, there still remains a significant need for a way and solution to prevent damage from stored alkaline batteries that eventually will leak, usually inside the chambers of the electronics that they power.

SUMMARY OF THE INVENTION

A system couples with a terminal end of a battery and mitigates battery leakage. The system includes a conductive disc and an absorption ring that is secured to a surface of the conductive disc. The conductive disc has a center section and a peripheral section that surrounds the center section, and the absorption ring is configured for extending around the peripheral section. The absorption ring includes an absorbent material therein for absorbing liquids. An adhesive material is positioned proximate the absorption ring for securing the conductive disc and absorption ring to an end of a battery so the conductive disc is electrically coupled with the terminal end and the absorption ring is in position for absorbing leaking fluids from a battery. The system can be separate from the battery or incorporated therein.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain and describe the principles of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention is directed to a system and elements for the mitigation of the effects and resulting damage from battery leakage, such as leakage from alkaline batteries. Although alkaline batteries are discussed herein, other batteries wherein corrosive fluid may leak would also benefit from the system of the invention. The system releasably couples with a terminal end of the battery. In one embodiment, it couples with the negative terminal end of the battery where leakage may predominantly occur.

In one embodiment of the invention, the system is incorporated as a stand-alone system that attaches separately onto the end of the battery and electrically couples with a conductive terminal at the end of the battery. The system maintains the electrical continuity of the battery and any electronics of a device, and also captures and controls escaping fluids and chemicals from the battery to mitigate the effects and damage from such leakage. Specifically, the system is proximate the leakage area at the battery terminal and provides for the capture and subsequent absorption of some of the escaping battery leakage liquid. This provides for the containment of such liquid and any resulting solid matter that may result. The captured and contained liquid and resulting solids are prevented from flowing onto or otherwise contacting other objects to corrode or damage those objects, such as the electronics of the device that is powered by the batteries. The leakage liquid and resulting solids and are then rendered somewhat harmless.

In another embodiment of the invention, the system of the invention is incorporated into the battery while still providing a similar function of capturing and containing the fluids and chemicals that may leak from the battery and thus mitigating the effects of the leakage and any damage that may result from such leakage.

Figure 1:
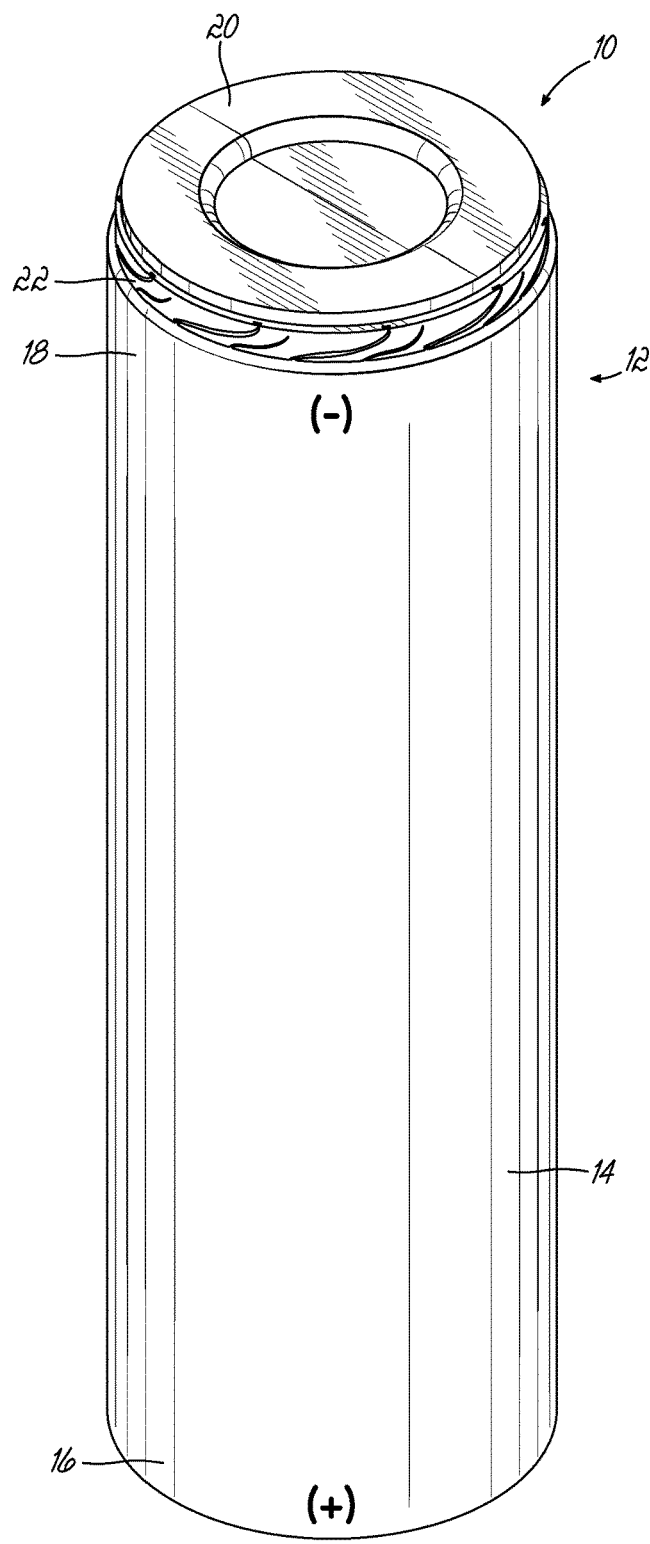
FIG. 1 is a perspective view of an embodiment of the system of the invention coupled with a battery for containment and/or mitigation of leakage in accordance with one aspect of the invention.

Turning to FIG. 1, the system 10 is illustrated incorporated onto an end of a battery 12. In accordance with one aspect of the invention, system 10 is incorporated onto the negative terminal of the battery as illustrated in FIG. 1. In a typical alkaline battery, the negative terminal is at the bottom of the battery, while the positive terminal is at what is considered the top of the battery as generally understood by a person of ordinary skill in the art. As an example, the system is illustrated installed at the negative terminal, but the invention is not so limited and may be used an either terminal where leakage is an issue. Also, while use on a single terminal is shown, the invention might be used on both terminals.

The exposed battery terminals are generally metallic and are sealed at either end by an outer housing 14 of the battery. The actual construction of the battery is not particularly critical with respect to the operation of the system 10 of the invention. As such, the housing 14 may have various different layers and sub-layers and usually includes an outer drum layer forming the particular cylindrical shape of the battery and including the chemical cells and other internal components that generate and provide the energy of the battery in the form of available electrical voltages and currents delivered through the terminal ends of the battery. In the embodiment illustrated in FIG. 1, the positive and negative terminals are indicated by reference numerals 16 and 18 accordingly.

As seen in FIG. 1, system 10 couples with the terminal end 18 of the battery and includes a number of cooperative components or elements that form essentially a shield system or sealing system for mitigation of the effects and damage of battery leakage, as discussed herein. In the embodiment illustrated in FIG. 1, system 10 does not provide a complete seal of the battery, but rather loosely seals an end of the battery and captures, absorbs and controls all or a significant portion of escaping liquids and chemicals from the battery. By such capture and subsequent absorption, detrimental effects and damage to the electronic device or particular elements of the electronic device are mitigated.

Figure 2:
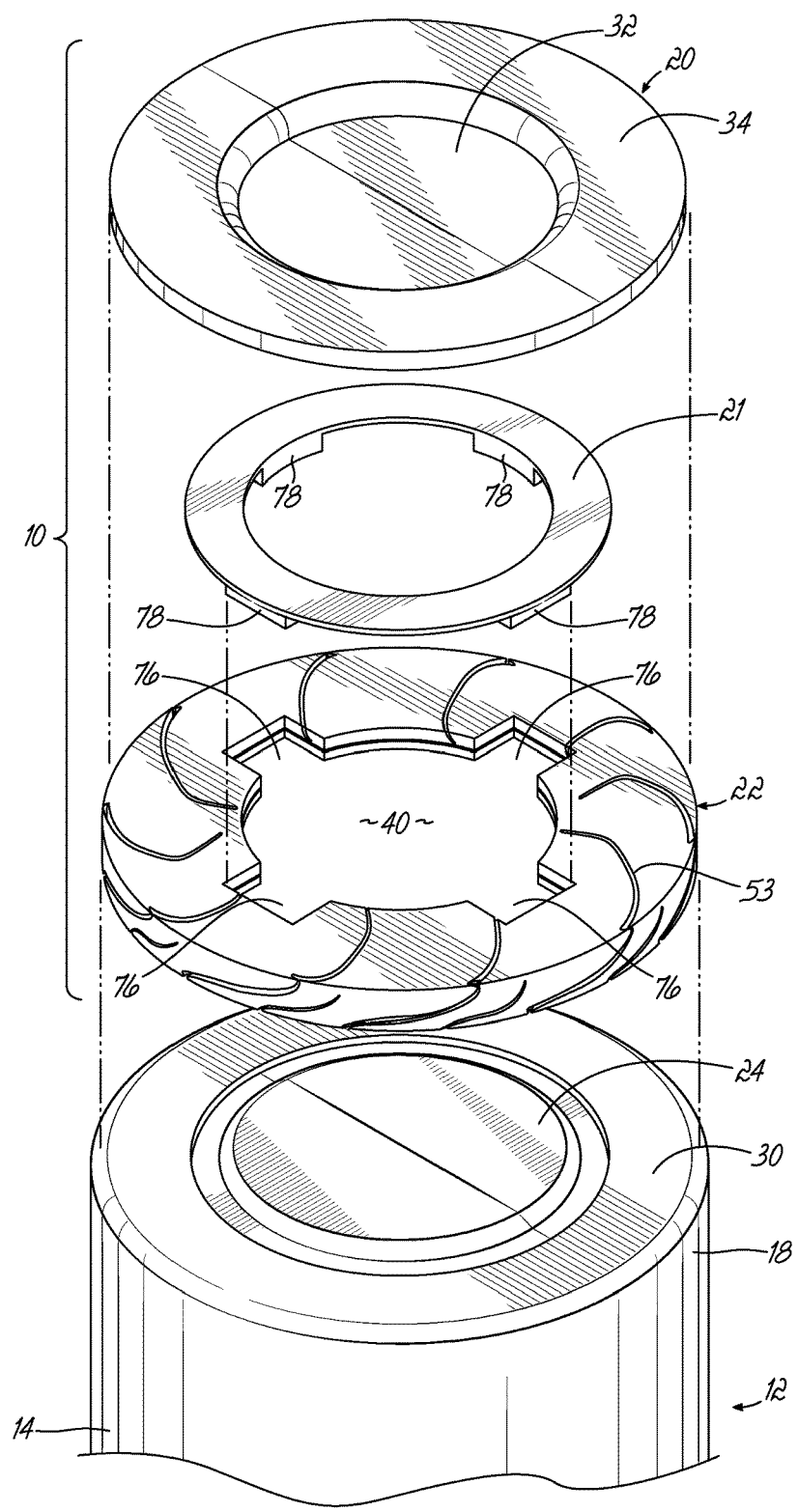
FIG. 2 is an exploded view of the system of the invention to be installed on the end of a battery in accordance with aspects of the invention.
Figure 3:
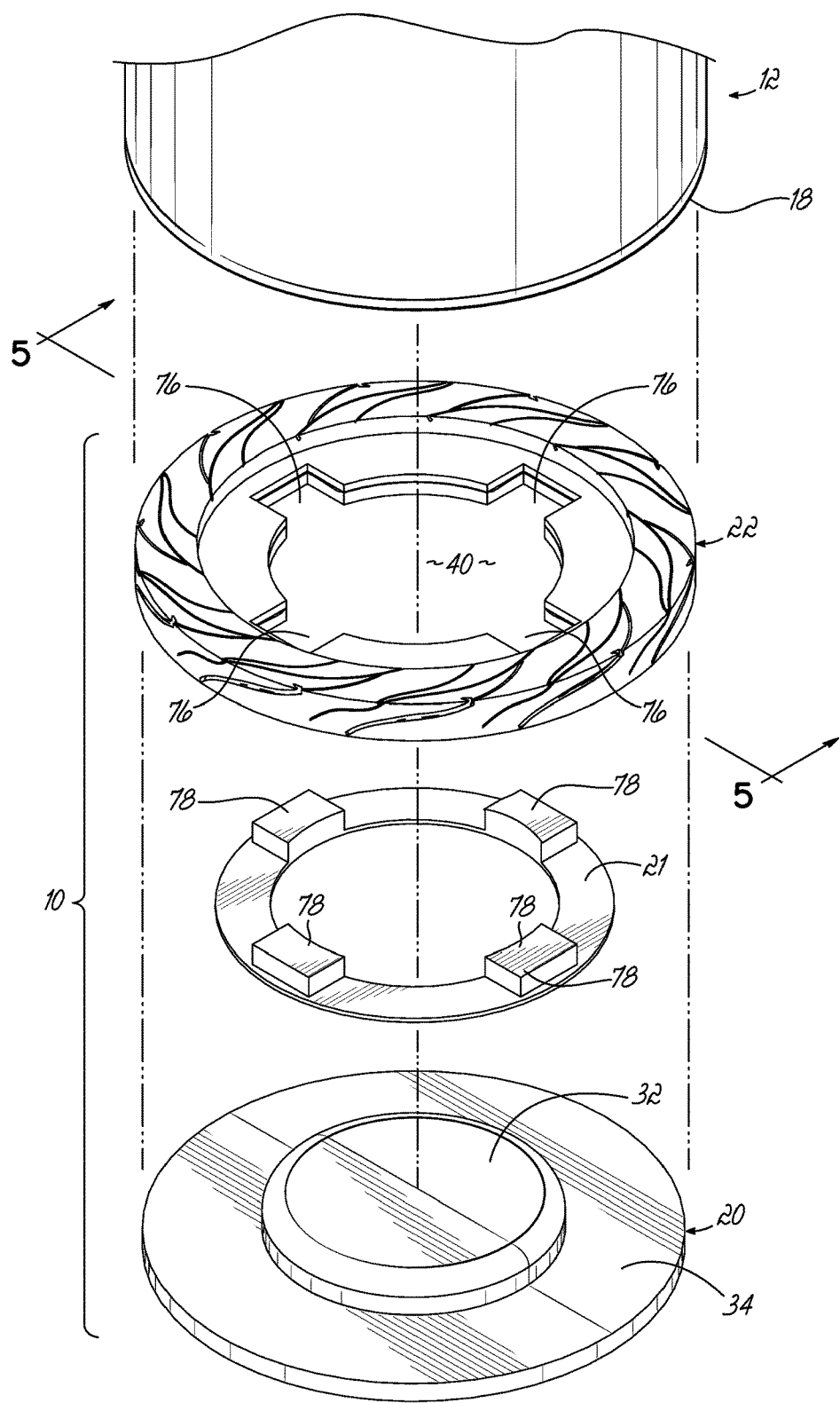
FIG. 3 is another exploded view of the system of the invention to be installed on the end of a battery in accordance with aspects of the invention.

In one embodiment of the invention, the system 10 includes a conductive disc 20 that couples with an absorption ring 22 to provide a unitary seal or shield element that is removably fixed to the end of a battery. The system both contains and absorbs leaking liquid while providing electrical continuity to the negative terminal of the battery. FIGS. 2 and 3 illustrate exploded views of one embodiment of the system in accordance with the invention. Referring now to FIG. 2, the terminal end 18 of battery 12 incorporates a negative electrical terminal 24. Generally, in many alkaline batteries, the negative terminal is in the form of a metallic end cap that has been sealed at its end by a portion of the housing 14. For example, the housing may wrap around the terminal end 18 as illustrated at 30 and engage the terminal end cap 24 to seal the end cap and battery housing and thus form the negative terminal. The conductive path of the electronic device then makes contact with the terminal end cap or terminal 24. Since the battery must function as normal using the invention, the system 10 incorporates a conductive disc 20 that electrically couples with terminal 24 and provides a continuous electrical path for the battery. Therefore, the invention does not adversely affect the operation of the battery.

As illustrated in FIG. 2, the conductive disc 20 includes a center section 32 and a peripheral section 34. In the embodiment of the invention that is illustrated, the center section 32 may be raised relative to the peripheral section in order to more vigorously engage terminal 24 through the absorption ring 22 as discussed herein. FIG. 3 illustrates a bottom up version showing the system 10 engaging the negative terminal end of the battery, which is usually at the bottom end. The conductive disc is formed of a metal, and in one embodiment is formed of nickel-coated steel. The nickel-coated steel generally matches the nickel-coated steel of the end cap that forms the negative terminal 24 of batteries such as battery 12. In that way, the metals are not dissimilar and thus there are not electrical and/or chemical issues associated with the contact between dissimilar metals. Therefore, the system 10 provides a suitable electrical continuity through the end of the battery when in use. The conductive disc may be formed of other metals as well and thus the invention is not limited to a specific metal.

Figure 3A:
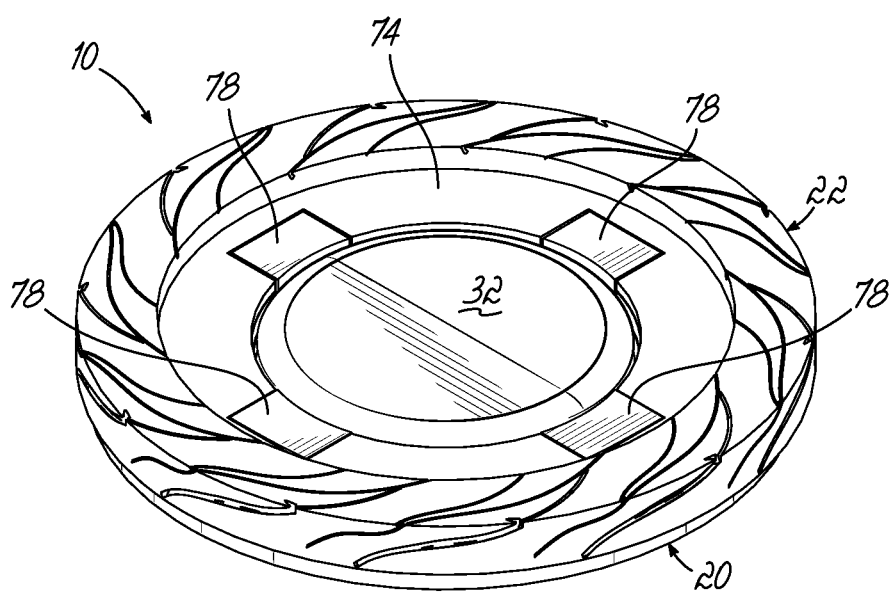
FIG. 3a is a perspective top view of an embodiment of the system of the invention showing the system separate from a battery on which it may be used.

The absorption ring 22 engages the end 18 of the battery and is secured to the surface of the conductive disc. Specifically, as illustrated in the figures, the absorption ring extends around the peripheral section 34 of the conductive disc, thus surrounding the center section 32 so that the center section is electrically exposed. The absorption ring 22 is secured with the conductive disc with adhesive material 21, such as in the form of an adhesive ring pattern that is positioned between the disc and absorption ring. The stacked arrangement of the various elements of the system is illustrated in FIG. 3A. The absorption ring 22 thus has an open center area 40 through which the center section 32 of conductive disc 20 extends or is exposed for engagement with terminal 24. As such, as noted herein, the absorption ring, while secured against the end 18 of the battery, does not interfere with the electrical properties of the battery.

In accordance with one aspect of the invention, the absorption ring contains and absorbs leaking chemicals and liquids at the end 18 of the battery where it is attached. More specifically, as noted herein, significant pressures can build up within an alkaline battery. Under such pressure, the seal between the housing 14 and the end cap that forms the negative terminal 24 around section 30 will break down resulting in leakage of the liquid solution therein, such as liquid potassium hydroxide. Potassium hydroxide is particularly corrosive and thus can cause damage to electronic circuitry and other parts of an electronic device in which the battery is used. The absorption ring is constructed so that it functions to essentially surround the seal and contain and absorb escaping corrosive liquid. Accordingly, the absorption ring essentially acts as a seal or gasket proximate the end 18 of the battery. In one aspect of the invention, the system 10 as secured to the end of a battery does not completely stop leakage, but rather contains it, captures it and absorbs it within an expanding absorption ring as discussed herein.

FIGS. 4A-4D illustrate an exemplary embodiment of the formation of one suitable absorption ring for use in invention. Specifically, referring the example of FIG. 4A, the absorption ring material includes a membrane material layer or membrane blank 50 that is combined with an absorbent material and then subsequently molded into a unitary absorption ring. As discussed, the absorption ring captures the leakage liquid, expands, and contains the leakage liquid and byproducts.

In one embodiment of the invention, the membrane material layer is a paper base layer 50. The paper base layer may be formed of a suitable cotton filter paper for example. However, other paper material and other non-paper materials might be used to form such as blank 50 in accordance with features of the invention. In the embodiment illustrated, the layer 50 is folded and then molded to form the absorption ring. In another embodiment of the invention as described below, the membrane material might be molded or otherwise formed, such as by injection molding, using an injection moldable material.

In accordance with one aspect of the invention, the absorption ring includes an amount of an absorbent material therein for absorbing a liquid that contacts the absorption ring 22. As such, in the example of the illustrated figures, an absorbent material is added to the membrane material layer prior to the molding process.

Referring again to FIG. 4A, a thin layer of an adhesive material 52, such as a non-water based glue or adhesive may be applied to the paper base layer 50, such as around the center of the membrane blank 50. Then, a layer of an absorbent material 54 is applied on top of the adhesive layer. The absorbent material, in one embodiment of the invention, includes or is entirely an absorbent polymer material. In another embodiment, the absorbent material includes or is entirely a super absorbent polymer that has the ability to absorb as much as 200-300 times its mass in liquid. In one specific embodiment, the absorbent polymer material is sodium polyacrylate which is a sodium salt of poly acrylic acid.

However, the invention is not limited to one particular material and, other absorbent materials, including other absorbent polymer and super absorbent polymer materials might be utilized as elements of the absorbent material. For example, polymers made with other salts, such as potassium, lithium and ammonium, might be effective for the invention. Alternatively, there are several natural cellulose or fiber-based products that also can be incorporated, in whole or in part, as absorbent materials. These might include, but are not limited to, tissue paper, cotton, and sponge or fluff pulp. Alternatively, other natural materials of polysaccharides and proteins might be processed to have similar absorbent properties as synthetic polyacrylates. Still further, super absorbent polymer materials might also be synthesized with cross-linked carboxymethylcellulose, polyvinyl alcohol copolymers, ethylene maleic anhydride copolymers, cross-linked polyethylene oxides and starch grafted copolymers of polyacrylonitrile. Accordingly, the absorbent material of the invention might include one or more of various absorbent materials and combinations of various absorbent materials incorporated into the membrane material for forming the absorption ring.

Figure 4A:
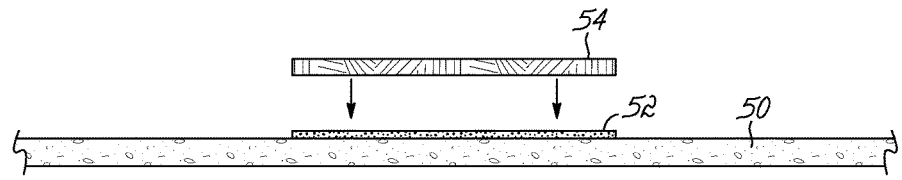
FIGS. 4A-4D are side cross-sectional views showing the formation of the system of the invention.
Figure 4B:
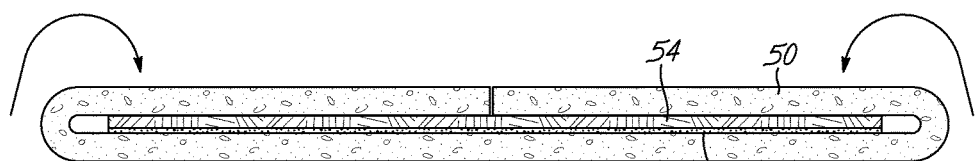

The absorbent material 54 engages the adhesive material 52 to secure it with the paper base layer 50 or other membrane material layer. The absorbent material may flow into the adhesive layer 52 for securing the absorbent material layer with the paper base layer 50. The edges of the paper base layer are then folded over upon the layers 52 and 54 as illustrated in FIG. 4B. More specifically, the outer edges may be folded in an overlapping fold toward the center of the paper base as illustrated by fold lines 53 in FIG. 2. In that way, as seen in FIG. 4B, the absorbent material layer 54 is sandwiched between paper layers. Because the absorbent material expands upon engagement with an absorbed liquid, the containment of the absorbent material ensures that the leakage products are captured with the absorption ring and thereby contained to avoid a mess with at the end of a leaking battery.

Figure 4C:
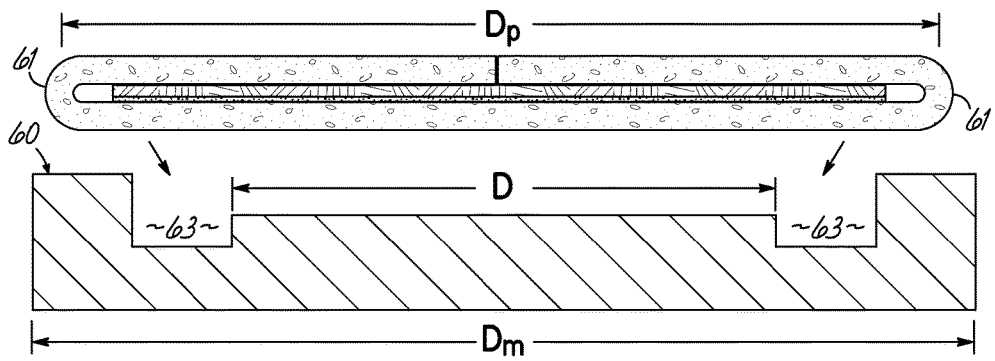
Figure 4D:
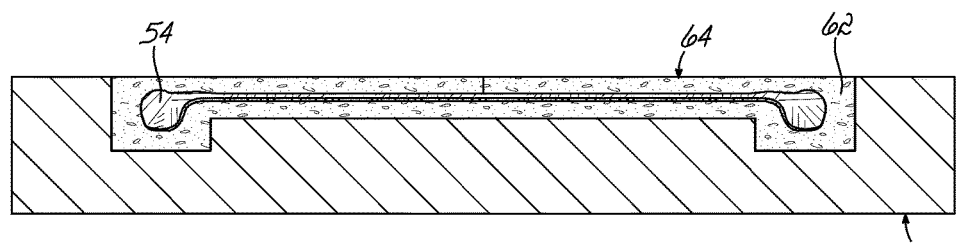
Figure 5:
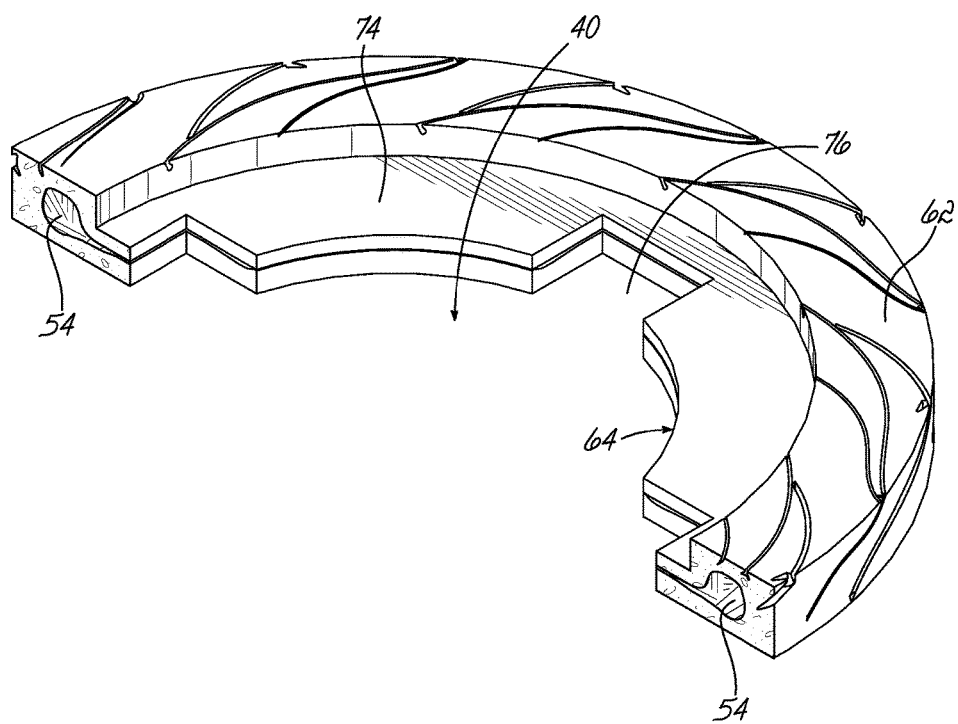
FIG. 5 is a perspective top view, in partial cross-section of an embodiment of the system of the invention illustrating internal features.

At that stage, the absorption ring is in the form of a generally flat disc having multiple paper layers with an absorbent material contained therebetween. The absorption ring 22 might then be further molded. In one embodiment, the absorption ring is compressed within a mold or die 60 as shown in FIG. 4C. As illustrated in the Figures, the absorption ring may be formed to have a raised peripheral portion 62 that has a greater thickness than the thickness of the center portion 64 of the absorption ring as illustrated in FIGS. 4D and 5. In the mold 60, the outer circumferential edge 61 of the folded paper base layer 50 and contained absorbent material 52 is directed and manipulated spirally, such as with a rolling press, around the mold to bunch the edge materials to fit within the mold and to form the raised peripheral portions 62. As shown in FIGS. 4C and 4D, the mold has a smaller diameter $D_m$ than the diameter $D_p$ of folded paper base layer 50 and the layer 50 is thus manipulated and bunched into the mold at the edges. In accordance with one aspect of the invention, the formation of the raised peripheral portion 62 and bunched edge accumulates the folded paper material and a significant amount of the absorbent material 54, such as the absorbent polymer material, at the peripheral portion 62. As such, the absorption ring 22 thus forms a thicker or raised peripheral sealing portion around the peripheral edge as illustrated in FIG. 5. The bunched and compressed paper material and absorbent material can then expand upon absorbing the liquid leakage material from the battery.

In an alternative embodiment of the invention, the membrane material might include an injection molded material that is permeable and contains the absorbent material. In that case, the membrane material might be made of an injection moldable material that might include one or more of materials such as latex, silicone, urethane, ethyl vinyl acetate plastic, polyethylene, polypropylene, polyvinylidene fluoride and polytetrafluoroethylene. The membrane material or absorption ring may then be molded into the appropriate shape as illustrated for containing absorbent material. In one exemplary process the injection moldable material might be processed with a volatile substance under a low pressure for forming internal voids upon evaporation of the volatile substance.

Figure 6:
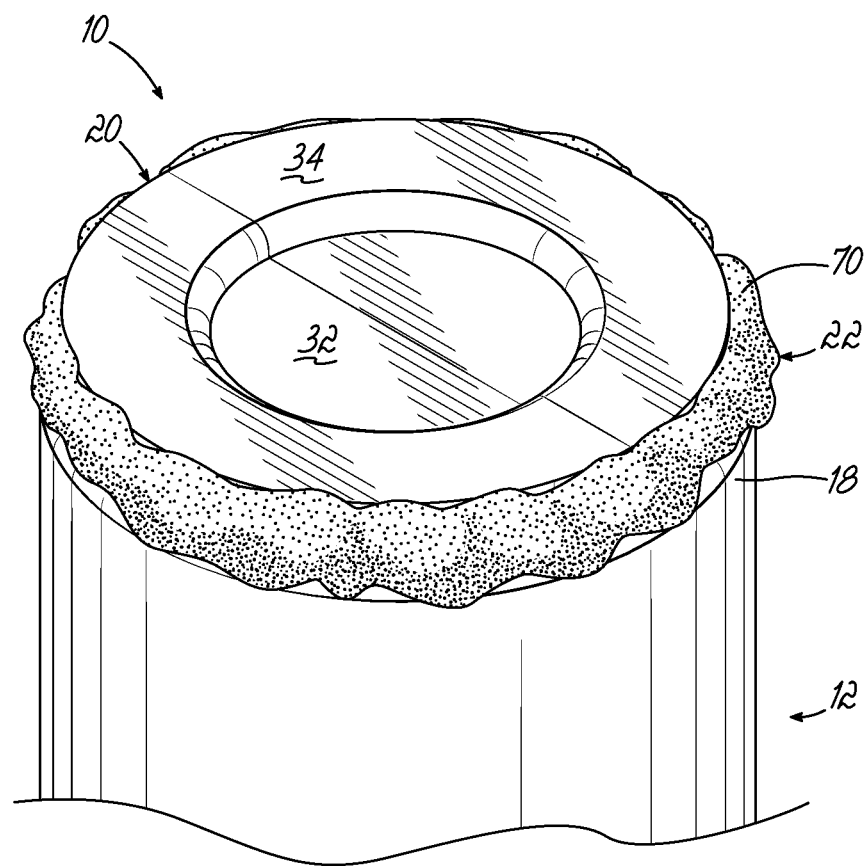
FIG. 6 is a perspective view of an embodiment of the system of the invention showing the system incorporated on a battery to capture and contain the products of a battery leakage.

As may be appreciated, referring to FIG. 5 and FIGS. 2-3, the face surface having the raised peripheral portion sits against the terminal end 18 of a battery 12. In that way, it provides a peripheral seal or gasket element containing significant amounts of the absorbent material which is able to then capture leaking liquid and absorbed the liquid for mitigation and prevention of damage caused by the battery leakage. In accordance with one aspect of the invention, the paper material and absorbent material of the absorption ring are compressed to form the absorption ring. More specifically, the paper material and absorbent material contained thereby are compressed and pressed into the shape of the absorption ring in a mold 60 under a sufficient pressure to ensure the absorption ring maintains its desired shape in use. With the various features provided by the raised peripheral portion 62 and bunched materials, the compressed absorption ring and contained absorbent material will expand upon the absorption of leaking battery liquid, thus absorbing and controlling the escaping liquid and chemicals. As illustrated in FIG. 6, the absorption ring is illustrated in an expanded form after absorption of liquid chemicals leaking from the end of the battery.

Generally, the leakage material is a liquid chemical solution and upon evaporation, the potassium hydroxide combines with existing carbon dioxide in the air to form potassium carbonate in the form of a white crystal or crystalline material 70 as illustrated in FIG. 6. As shown in the Figure, the leaked material in the form of a solid 70 is thereby contained and held within and on the absorption ring 22. This prevents of flow of the material away from the battery and onto sensitive components, such as printed circuit boards and other electronic components. In accordance with one aspect of the invention, if the slow battery leak develops, the process of the oxidizing potassium hydroxide may form a hard cover over the battery terminal as shown in FIG. 6 while still leaving the conductive disc intact allowing for continued use of the battery. Of course if the leak is more significant and in the form of an explosion, the system contains the liquid flow and mitigates the damage from battery leakage.

Returning again to FIGS. 4A-4D and 5, once the folded paper base layer 50 and absorbent material has been formed in the mold 60, the center of the molded structure is punched with an appropriate die or punch to form the opening 40 as illustrated in FIGS. 2-3 and 5 and thus form the absorption ring structure of the invention. The size of the opening 40 is made to coincide with the size of the raised center section 32 of the conductive disc so that the center section extends through the opening 40 and engages terminal 24 of the battery. In that way, electrical continuity is maintained utilizing the system of the invention and system just essentially forms a terminal of the battery when the inventive system is in use.

In accordance with another aspect of the invention, the absorption ring may be formed to contain the terminal 24 of the battery. More specifically, raised peripheral portion 62 of the absorption ring may is formed so as to surround the terminal 24 of the battery. That is, the diameter dimension D as illustrated in FIG. 4C between the features of the mold that form the raised peripheral portion 62 is dimensioned such that the terminal 24 of the battery fills a significant portion of the cavity 74 that is defined by the raised peripheral portion 62 and the center portion 64 of the absorption ring.

In accordance with another feature of the invention, the adhesive material that is used to secure the conductive disc 20 with the absorption ring 22 is also partially used to releasably secure the entire system 10 to the end of the battery. To that end, referring to FIGS. 2 and 3, adhesive material 21 is positioned between the conductive disc 20 and absorption ring 22 to secure the two elements together. For example, the adhesive may be applied in a ring pattern as illustrated in FIGS. 2 and 3 so as not to interfere with the conductive disc electrical connection, and particularly center section 32 that engages terminal 24 of the battery. In that way, the absorption ring is firmly secured to the conductive disc so the system operates as a unitary element. In one embodiment, the same adhesive material 21 is also utilized to secure the conductive disc and absorption ring to the end of the battery 12. To that end, the opening 40 is formed to also include one or more outer cutout areas or notches 76. The cutout areas or notches 76 expose one or more portions of the adhesive material 21, such as the adhesive ring as illustrated in the drawings, to the side of the absorption ring 22 that is exposed to the terminal end 18 of battery 12. In the illustrated embodiment, a plurality of areas 76 are positioned around the absorption ring. As such, the adhesive 21 may flow through or otherwise be exposed at numerous positions by the areas/notches 76 and form a series of adhesive areas 78 positioned around the ring of adhesive material 21 as illustrated in FIGS. 2, 3 and 3A. The areas 78 are shown in an exaggerated or thicker form within FIGS. 2 and 3 for illustrative purposes. Generally, they will be formed by adhesive material flowing through the cutout areas 76 to a side of the absorption ring opposite the conductive disc as seen in FIG. 3A.

As such, those adhesive areas 78 are exposed to battery 12, and particularly to surface 30 surrounding terminal 24 and to the terminal as shown in FIG. 2. Generally, during the formation of the inventive system, the exact flow the adhesive material 21 may not be precisely defined, and thus, some adhesive may also contact terminal 24. The exposed adhesive areas 78 thus will stick to surface 30 and/or terminal 24 and secure the system to battery 12. In one embodiment, the adhesive material or adhesive ring 21 uses a gel glue, that is generally non-hardening. The adhesive material 21 is not degraded by the corrosive effects of the leaking potassium hydroxide.

Because most of the adhesive material 21 is located between the conductive disc and the absorption ring, the adhesive material 21 acts as a generally permanent bond between the conductive discs and the absorption ring. Because a small amount of the adhesive 12 is exposed by the notches to form smaller adhesive areas 78, the adhesive 21 also forms a generally releasable bond between the system 10 and the end of the battery 18. Generally, if a non-hardening adhesive material is used, the securement of the system 10 to battery 12 may be somewhat temporary and releasable. That is, it will be sufficient enough to hold the system 10 in place for usage with the battery, such as in an electronic device. However, if the system is to be removed, including both the conductive disc and absorption ring, it may be peeled away from the end 18 of the battery so the system might be reused with another battery.

Therefore, adhesive material provides a desirable alignment of the system elements into a unitary system for placement over the terminal 24 of the battery and allows for proper positioning and functioning of the system and contact of the conductive disc in use. At the same time, the temporary bond provided by the exposed adhesive of the smaller areas 78 allows removal the system 10, such as from a non-leaking, but depleted battery and provides for reuse of that same system on a new replacement battery. In that way, if the batteries do not leak, the invention may be used and reused as necessary. Therefore, the unique construction and shape of the absorption ring and the notch areas exposing adhesive underneath the absorption ring eliminate a separate adhesive step in securing the system to a battery and provides for reusability of the inventive system.

In accordance with the invention, the system 10 has effective dimensions, and in the case of a round battery, an effective diameter for covering an and of the battery for capturing leakage products. In one feature of the invention, the absorption ring is dimensioned to be slightly larger than the conductive disc. In that way, the absorption ring prevents the conductive disc from shorting out with surrounding materials that might contain the battery. Therefore, the system further ensures that the electrical function of the battery is not compromised.

Figure 7:
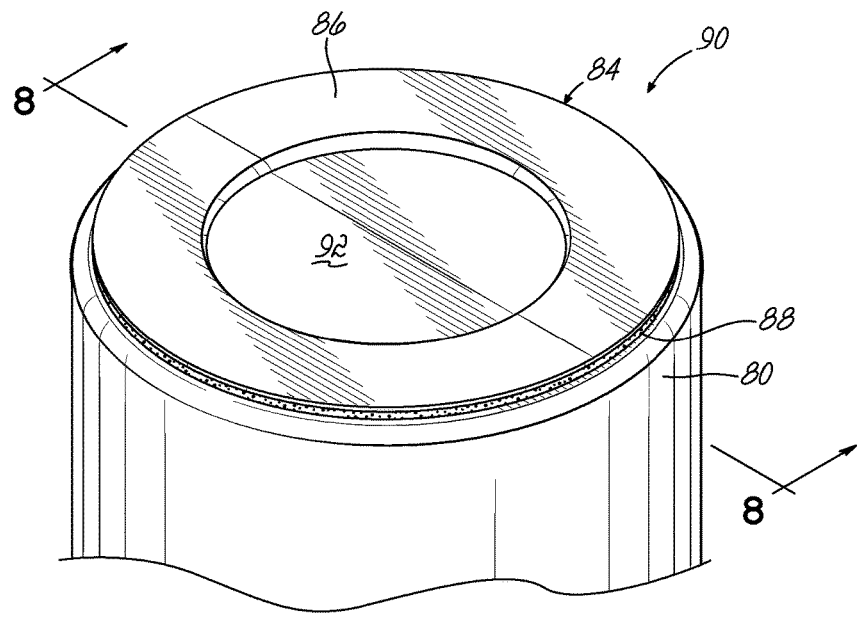
FIG. 7 is a perspective view of another embodiment of the invention incorporated into a battery design.
Figure 8:
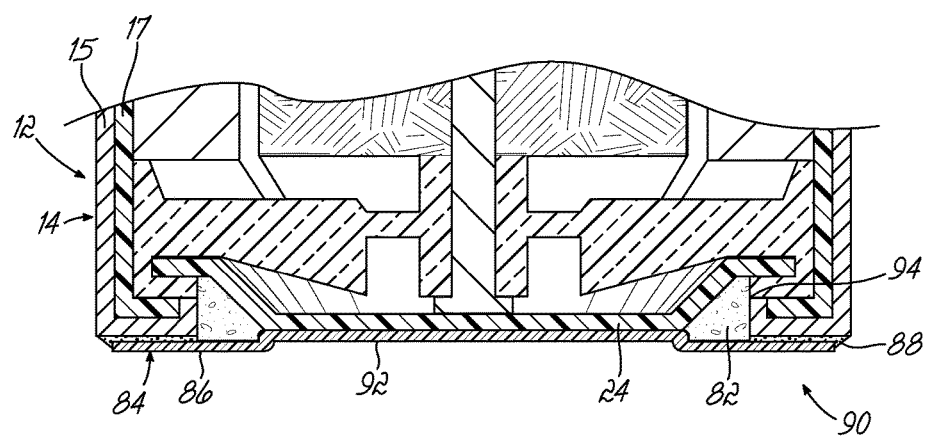
FIG. 8 is a side view, in partial cross-section, of the embodiment of the system in FIG. 7 incorporated into the end of a battery.

FIGS. 7 and 8 illustrate an alternative embodiment of the invention wherein the absorption ring and conductive disc are incorporated more specifically into the construction of a battery. Specifically, referring to FIGS. 7 and 8, a battery 80 is illustrated and incorporates features of the invention. Specifically, the battery utilizes an absorption ring element 82 and conductive disc for containing and capturing battery leakage of those mitigating the damage caused by such battery leakage. Specifically, as illustrated in FIG. 7, the system 90 is incorporated on one end of the battery 80, such as the negative terminal end. A conductive disc 84 has a construction that may be somewhat similar to the conductive disc 20 as utilized in other embodiments of the invention. For example, the conductive disc 84 may include a center section 92 that is raised relative to a peripheral section 86. The conductive disc 84 may be formed of a suitable metal material, such as a nickel-coated steel that electrically couples with a terminal 24 of a battery. As illustrated in the cross section of FIG. 8, the battery housing 14 may include one or more layers 15, 17 which form the housing that contains a fuel cell or power cell. The power cell operates chemically or otherwise for the generation of electricity, in accordance with known battery technology. The housing is sealed with a metallic endcap that electrically couples with the power cell components and forms terminal 24 for the transfer of electricity from the battery. The conductive disc 84 is electrically coupled to terminal 24 for electrical continuity. For example, disc 84 might be spot welded to the terminal 24. An absorption ring element 82 may be secured around terminal 24 and then sealed within the end of the battery 12 by the conductive disc 84. An expandable membrane material or layer 88 might be used and would expand to allow the expansion of the absorption ring element 82. Alternatively, the space of layer 88 might remain open to allow suitable expansion of the absorption ring element 82.

In accordance with one embodiment of the invention, the absorption ring element used in the battery 80 might have a construction similar to absorption ring 22 discussed herein and may include folded paper layers which encase or entrap an absorbent material, such as an absorbent or super absorbent polymer material. As such, the absorption ring 82 would be positioned within the space 94 defined between terminal 24, the housing layers 15, 17 and the conductive disc or endcap 84 as shown in FIG. 8. In an alternative embodiment the invention, the absorption ring might just include the absorbent material that is packed into the available space 94 without paper layers or elements. In accordance with a feature of the invention, if the battery were to leak, such as around the interface between the housing 14 and terminal 24, the absorption ring structure or material can absorb and capture and thereby contain the corrosive chemical and thus keep it from flowing significantly out of and away from the battery and onto the electronics of a device or other elements of a device containing the battery in accordance with features of the invention.

The invention in its broader aspects is not limited to the specific details of the representative apparatuses and methods, and illustrative examples shown and described. For example, while a cylindrical battery having a circular cross-section is illustrated, the battery might also be boxed shape and have a rectangular cross section and the system may be constructed to address such shapes. Accordingly, departures may be made from such details as disclosed herein without departure from the spirit or scope of applicant's general inventive concept.

What is claimed is:

1. A system for coupling with a terminal end of a battery for mitigation of battery leakage comprising:
 a conductive disc having a center section and a peripheral section surrounding the center section;
 an absorption ring secured to a surface of the conductive disc and configured for extending around the peripheral section to surround the center section;
 the absorption ring including an absorbent material therein for absorbing a liquid;
 an adhesive material positioned proximate the absorption ring for securing the conductive disc and absorption ring to an end of a battery so the conductive disc is electrically coupled with the terminal end.

2. The system of claim 1, wherein the absorbent material includes an absorbent polymer material.

3. The system of claim 2, wherein the absorbent polymer material includes at least one of a salt of sodium, potassium, lithium, ammonium.

4. The system of claim 1, wherein the absorbent material includes at least one of sodium polyacrylate, tissue paper, cotton, sponge, fluff pulp, polysaccharides, proteins, cross-linked carboxymethylcellulose, polyvinyl alcohol co-polymers, ethylene maleic anhydride copolymers, cross-linked polyethylene oxides and starch grafted copolymers of polyacrylonitrile.

5. The system of claim 2, wherein the absorbent polymer material includes sodium polyacrylate.

6. The system of claim 1, wherein the absorption ring is formed of a membrane material that includes at least one of a paper material or an injection moldable material for containing the absorbent material.

7. The system of claim 6 wherein the membrane material and absorbent material of the absorption ring are compressed.

8. The system of claim 1, wherein the center section of the conductive disc is raised relative to the peripheral section.

9. The system of claim 1, wherein the conductive disc is formed of metal.

10. The system of claim 9, wherein the conductive disc is formed of nickel coated steel.

11. The system of claim 1, wherein the absorption ring has a diameter that is larger than a diameter of the conductive disc.

12. The system of claim 1, wherein the adhesive material is positioned between the absorption ring and conductive disc for securing the absorption ring to the conductive disc, the absorption ring including at least one cutout area for exposing a portion of the adhesive material for securing the conductive disc to an end of a battery.

13. The system of claim 1, wherein the absorption ring includes a raised peripheral portion having a thickness greater than a thickness of a center portion of the absorption ring.

14. The system of claim 1, wherein the adhesive material includes a non-hardening adhesive for releasably securing the conductive disc to an end of a battery.

15. A battery for mitigation of battery leakage comprising:
a housing;
a power cell contained within the housing for generation of electricity;
a terminal coupled with the power cell;
an absorption ring positioned in the housing and configured for extending around the terminal;
the absorption ring including an absorbent material therein for absorbing a liquid that may leak from the battery housing proximate to the terminal;
a conductive disc configured for sealing the absorption ring in the housing and being electrically coupled with the terminal.

16. The system of claim 15 wherein the absorbent material includes an absorbent polymer material.

17. The battery of claim 16, wherein the absorbent polymer material includes at least one of a salt of sodium, potassium, lithium, ammonium.

18. The battery of claim 17, wherein the absorbent material includes at least one of sodium polyacrylate, tissue paper, cotton, sponge, fluff pulp, polysaccharides, proteins, cross-linked carboxymethylcellulose, polyvinyl alcohol co-polymers, ethylene maleic anhydride copolymers, cross-linked polyethylene oxides and starch grafted copolymers of polyacrylonitrile.

19. The system of claim 15, wherein the absorption ring is formed of a membrane material that includes at least one of a paper material or an injection moldable material for containing the absorbent material.

20. The battery of claim 15, wherein the conductive disc is formed of nickel coated steel.

* * * * *